United States Patent
Hashizume et al.

(10) Patent No.: US 9,126,861 B2
(45) Date of Patent: Sep. 8, 2015

(54) METAL-COATED FLAKE GLASS, RESIN COMPOSITION INCLUDING SAME, AND METHOD FOR PRODUCING SAME

(75) Inventors: Yoshiki Hashizume, Osaka (JP); Takayuki Nakao, Osaka (JP); Shuichi Takenaka, Osaka (JP); Kazuya Fujimoto, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 7 days.

(21) Appl. No.: 13/576,860

(22) PCT Filed: Jan. 13, 2011

(86) PCT No.: PCT/JP2011/050456
§ 371 (c)(1),
(2), (4) Date: Aug. 2, 2012

(87) PCT Pub. No.: WO2011/096259
PCT Pub. Date: Aug. 11, 2011

(65) Prior Publication Data
US 2012/0296026 A1    Nov. 22, 2012

(30) Foreign Application Priority Data
Feb. 3, 2010  (JP) .................... 2010-022268

(51) Int. Cl.
*C08K 9/02*   (2006.01)
*C03C 17/36*  (2006.01)
*C09C 3/00*   (2006.01)

(52) U.S. Cl.
CPC ............. *C03C 17/36* (2013.01); *C03C 17/3605* (2013.01); *C08K 9/02* (2013.01); *C09C 3/006* (2013.01); *C01P 2004/03* (2013.01); *C01P 2006/60* (2013.01); *C01P 2006/80* (2013.01); *Y10T 428/2996* (2015.01)

(58) Field of Classification Search
CPC ...... C03C 17/3605; C08K 9/02; C09C 3/006; C09C 3/063

USPC .......................................... 523/200; 428/406
See application file for complete search history.

(56) References Cited

U.S. PATENT DOCUMENTS

| | | | |
|---|---|---|---|
| 4,319,803 A | | 3/1982 | Burmeister et al. |
| 5,436,077 A | * | 7/1995 | Matsuba et al. ............... 428/404 |
| 5,474,605 A | | 12/1995 | Schmid et al. |
| 6,325,847 B1 | | 12/2001 | Christie et al. |
| 6,517,939 B1 | * | 2/2003 | Moini et al. ................... 428/402 |
| 2006/0112859 A1 | | 6/2006 | Pfaff et al. |
| 2006/0150864 A1 | | 7/2006 | Hashizume et al. |

FOREIGN PATENT DOCUMENTS

| | | |
|---|---|---|
| CN | 201106022 Y | 8/2008 |
| JP | 55-79301 | 5/1980 |
| JP | 55-165970 A | 12/1980 |
| JP | 62-175045 U | 11/1987 |
| JP | 3-25525 U | 3/1991 |
| JP | 3-54126 A | 3/1991 |
| JP | 4-193725 A | 7/1992 |
| JP | 9-142887 A | 6/1997 |

OTHER PUBLICATIONS

Ribeiro et al., "Study of Hybrid Silica-Polyethyleneglycol Xerogels by Eu3+ Luminescence Spectroscopy," Journal of Sol-Gel Science and Technology, vol. 13, pp. 427-432 (1998).
Sang et al., "Characteristics of chromium—aluminum—silicon dioxide thin films deposited on PMMA glass substrate by electron beam evaporation process," Vacuum, vol. 45, No. 5, pp. 46-48 (Sep. 2008).

* cited by examiner

*Primary Examiner* — Vickey Nerangis
(74) *Attorney, Agent, or Firm* — Birch, Stewart, Kolasch & Birch, LLP (57) ABSTRACT

A metal-coated flake glass of the present invention includes: a flake glass; a metal coating layer formed to coat a surface of the flake glass; and a silicon oxide-based protective layer formed to coat a surface of the metal coating layer. The silicon oxide-based protective layer contains nitrogen at an amount of 0.05 mass % to 0.5 mass % relative to a whole of the metal-coated flake glass.

5 Claims, 1 Drawing Sheet

METAL-COATED FLAKE GLASS, RESIN COMPOSITION INCLUDING SAME, AND METHOD FOR PRODUCING SAME

TECHNICAL FIELD

The present invention relates to a metal-coated flake glass in which a metal coating layer is formed on a surface of a flake glass, a resin composition including the metal-coated flake glass, and a method for producing the metal-coated flake glass.

BACKGROUND ART

Flake metallic pigments such as aluminum, mica, alumina, and bronze have been widely used to provide metal-tone appearances to cars, electrical appliances, cosmetics, building materials, and the like. A flake glass, which has a flat shape and a smooth surface, is one of such flake metallic pigments, and exhibits distinctive luster and shining look. Hence, the flake glass is widely used by blending it with a coating agent, such as a paint or ink, or a molding resin.

When a metal coating layer is formed on the surface of such a flake glass, a metal-coated flake glass having distinctive metallic luster is obtained. Such a metal-coated flake glass has been used to provide metallic look and shining look to paints, cosmetics, and the like (for example, see Japanese Utility Model Laying-Open No. 62-175045 (Patent Literature 1), Japanese Patent Laying-Open No. 55-165970 (Patent Literature 2), and the like).

Further, a metal-coated flake glass in which the surface of the above-described metal coating layer is further coated with another layer has been also known (Japanese Patent Laying-Open No. 03-054126 (Patent Literature 3) and Japanese Patent Laying-Open No. 04-193725 (Patent Literature 4)).

CITATION LIST

Patent Literature

PTL 1: Japanese Utility Model Laying-Open No. 62-175045
PTL 2: Japanese Patent Laying-Open No. 55-165970
PTL 3: Japanese Patent Laying-Open No. 03-054126
PTL 4: Japanese Patent Laying-Open No. 04-193725

SUMMARY OF INVENTION

Technical Problem

When the metal coating layer formed to coat the surface of the flake glass in each of such conventional metal-coated flake glasses is exposed to corrosive environment, a painted film containing this metal-coated flake glass therein will be changed in color with passage of time, disadvantageously. Such a problem takes place noticeably particularly when the metal constituting the metal coating layer is one of silver, copper, and an alloy thereof.

Specifically, in the case where the metal constituting the metal coating layer is silver or a silver alloy, silver ions are eluted into the painted film under influence of moisture, thereafter are reduced by ultraviolet rays and the like, and are accordingly formed into yellow colloids, which are generated in the coating film. Accordingly, the painted film changes into yellow. In addition, in the case where the metal constituting the metal coating layer is copper or a copper alloy, moisture having entered the painted film reacts with each of the metals to generate copper oxide, which is dull in metallic luster. This results in decreased metallic luster. Such a problem is particularly noticeable in water-based paint or water-based ink, both of which are becoming rapidly pervasive in recent years.

In order to solve such a problem, the follow techniques have been developed.

For example, Patent Literature 3 proposes a silver-coated (silver serving as a metal coating layer) flake glass obtained by dispersing and holding silver-coated glass flakes in an alkaline solution containing a silicon alkoxide, water, and alcohol, separating them, and providing heating treatment thereto to form a $SiO_2$ coating film on each of the surfaces thereof.

Further, Patent Literature 4 proposes a flake glass having a dense protective coating layer on its surface. The flake glass is obtained as follows. That is, flake glasses each having a metal coating layer formed on its surface are held in an alkaline solution containing metal alkoxide, water, and alcohol, and are thereafter separated. Resulting flake glasses are fired in a specific temperature range for a specific range of firing time. Then, 5 g of flake glasses are introduced into a 100 ml of pure water having a pH of 6.8 and are boiled for 10 minutes. A supernatant liquid thereof accordingly has a pH value of less than 10.

Unfortunately, in the flake glass of each of Patent Literature 3 and Patent Literature 4, corrosion of the metal coating layer formed on the flake glass cannot be prevented completely. Particularly, although Patent Literature 4 also proposes a flake glass having a dense protective coating layer having a surface treated with a silane coupling agent containing nitrogen, corrosion of the metal coating layer is not completely prevented.

In addition, each of the production methods described in Patent Literature 3 and Patent Literature 4 involves the heating step to result in large power consumption. Hence, improvements have been sought in terms of production cost and global warming prevention.

The present invention has been made in view of the above-described circumstance, and has an object to provide a metal-coated flake glass in which corrosion of its metal coating layer is prevented as much as possible.

Another object of the present invention is to provide a method for producing the metal-coated flake glass, the method requiring no costly energy cost, being simple and inexpensive, and contributing to global warming prevention.

Solution to Problem

The metal-coated flake glass of the present invention includes: a flake glass; a metal coating layer formed to coat a surface of the flake glass; and a silicon oxide-based protective layer formed to coat a surface of the metal coating layer, the silicon oxide-based protective layer containing nitrogen at an amount of 0.05 mass % to 0.5 mass % relative to a whole of the metal-coated flake glass.

Here, the metal coating layer is preferably constituted of one of silver, copper, and an alloy thereof. Further, the silicon oxide-based protective layer is preferably constituted of an aggregate of silicon oxide-based particles having an average particle size of 10 nm to 100 nm. The silicon oxide-based protective layer preferably has an average thickness of 30 nm to 300 nm and has a property to develop a color when a gold thin film is deposited thereon.

The present invention is also directed to a resin composition including a resin and the above-described metal-coated flake glass.

Meanwhile, a method for producing a metal-coated flake glass in the present invention includes the steps of: preparing a flake glass having a surface coated with a metal coating layer; and forming a silicon oxide-based protective layer by dispersing the flake glass in a mixed solution including a silicon alkoxide, a nitrogen-containing compound, water, and a hydrophilic solvent so as to deposit silicon oxide-based particles and the nitrogen-containing compound on the metal coating layer of the flake glass.

Further, in the step of forming the silicon oxide-based protective layer, while dispersing the flake glass in a solution including the water and the hydrophilic solvent, the silicon alkoxide and the nitrogen-containing compound are preferably dropped thereto little by little in amount for 1 hour to 20 hours.

Further, the production method of the present invention preferably includes the step of drying the metal-coated flake glass at a temperature equal to or lower than a volatilization temperature of the nitrogen-containing compound.

Advantageous Effects of Invention

The metal-coated flake glass of the present invention has an excellent effect such that corrosion of the metal coating layer thereof is drastically suppressed. In addition, the method for producing the metal-coated flake glass in the present invention has an excellent effect such that it requires no costly energy cost, is simple and inexpensive, and contributes to global warming prevention.

DESCRIPTION OF EMBODIMENTS

The following describes the present invention more in detail.

<Metal-Coated Flake Glass>

A metal-coated flake glass of the present invention includes: a flake glass; a metal coating layer formed to coat a surface of the flake glass; and a silicon oxide-based protective layer formed to coat a surface of the metal coating layer, the silicon oxide-based protective layer containing nitrogen at an amount of 0.05 mass % to 0.5 mass % relative to a whole of the metal-coated flake glass.

The metal-coated flake glass thus configured in the present invention can include any layer other than the layers described above, as long as it exhibits an effect of the present invention. The metal-coated flake glass of the present invention is used as a flake metallic pigment.

<Flake Glass>

For the flake glass used in the present invention, any flake glass having been used conventionally for this type of application can be used. The flake glass used in the present invention is not particularly limited. For example, flake glasses can be suitably used which have an average particle size of approximately 10 μm to approximately 1000 μm, have an average thickness of approximately 0.1 μm to approximately 10 μm, and have an aspect ratio of 5 or greater. Here, the average particle size can be measured through a laser diffractometry. The average thickness can be measured through cross section observation. The aspect ratio is determined from the average particle size and the average thickness, i.e., the average particle size/the average thickness.

Further, the composition of each of the flake glasses is not particularly limited, and can employ a normal glass material, such as a glass for a general plate glass, an E-glass, a lead glass, or a glass for an acid-resistant container.

<Metal Coating Layer>

The metal coating layer in the present invention is formed to coat the surface of the flake glass in order to provide specific metallic luster to the flake glass. It is preferable to entirely coat the surface of the flake glass. However, as long as an effect of the present invention is exhibited, partial coating of the surface of the flake glass with the metal coating layer is not deviated from the scope of the present invention.

Such a metal coating layer can be constituted of any metal having been conventionally used for this type of application. Thus, the metal constituting the metal coating layer is not particularly limited. Examples thereof include: noble metals such as gold, silver, and platinum; base metals such as nickel, copper, chromium, and zinc; and alloys thereof.

It should be noted that the metal coating layer is particularly preferably constituted of one of silver, copper, and an alloy thereof among the metals exemplified above. This is because these metals can provide particularly excellent metallic luster. Conventionally, use of these metals, which have such an excellent property, has been limited for this type of application because they are easily corroded. However, by employing the configuration of the present invention, each of the metals can be suitably used as the metal constituting the metal coating layer.

Here, the above-described expression "alloy thereof" is intended to indicate an alloy containing at least one of the metals exemplified above. For example, "alloy thereof" in the expression "silver, copper, and an alloy thereof" is assumed to encompass an alloy containing silver, an alloy containing copper, and an alloy containing both silver and copper.

It should be noted that the metal coating layer in the present invention may be constituted of only one layer or two or more layers. When the metal coating layer is constituted of two or more layers, a simple substance such as Pd, Ni, Sn, Pt, Au, or Zn or a compound containing them is preferably formed in contact with the surface of the flake glass as a pretreatment layer.

A method for forming such a metal coating layer in the present invention is not particularly limited. For example, the metal coating layer can be suitably formed using a chemical plating method such as an electroless plating method, a deposition method, a sputtering method, or the like. Such a metal coating layer has an average thickness of 10 nm to 300 nm, more preferably, 50 nm to 200 nm. The average thickness is determined as follows. That is, twenty metal-coated flake glasses arbitrarily selected are observed in cross section by means of SEM to measure the thickness of the metal coating layer of each metal-coated flake glass at five locations therein, thereby finding an arithmetic mean value thereof. The arithmetic mean value thus found is regarded as the average thickness. If the average thickness of the metal coating layer is less than 10 nm, sufficient metallic luster cannot be provided. On the other hand, if the average thickness thereof exceeds 300 nm, the entire thickness of the metal-coated flake glass becomes thick to possibly result in decrease of hiding property or insufficient sheen of a painted film, disadvantageously.

<Silicon Oxide-Based Protective Layer>

The silicon oxide-based protective layer in the present invention is formed to coat the surface of the metal coating layer in order to prevent corrosion of the metal coating layer. It is preferable to entirely coat the surface of the metal coating layer. However, as long as an effect of the present invention is exhibited, partial coating of the surface of the metal coating layer with the silicon oxide-based protective layer is not deviated from the scope of the present invention.

Such a silicon oxide-based protective layer contains, as a main component, one or more of silicon oxide represented by $SiO_X$ (X is any positive number); polysiloxane generated by hydrolysis of a silicon alkoxide; silicon hydrate; and the like. Regarding this, the expression "silicon oxide-based" in the present invention is intended to indicate a substance composed of one or more of silicon oxide represented by $SiO_X$ (X is any positive number); polysiloxane generated by hydrolysis of a silicon alkoxide; silicon hydrate; and the like.

A feature of the silicon oxide-based protective layer of the present invention lies in that the silicon oxide-based protective layer contains nitrogen at an amount of 0.05 mass % to 0.5 mass % (not less than 0.05 mass % (500 ppm) and not more than 0.5 mass % (5000 ppm)) relative to the whole of the metal-coated flake glass. The "nitrogen" herein is assumed to indicate an amount of nitrogen atoms (inclusive of ionized atoms) (rather than an amount of nitrogen gas ($N_2$)).

The present invention has been made by finding that such a specific amount of nitrogen in the silicon oxide-based protective layer leads to very effective prevention of corrosion of the metal coating layer. Such an effect is exhibited when nitrogen is contained in and distributed throughout the silicon oxide-based protective layer. This effect is never exhibited when only a surface portion of the silicon oxide-based protective layer is treated with a nitrogen-containing compound (for example, when the surface of the silicon oxide-based protective layer is treated with a silane coupling agent containing nitrogen as in Patent Literature 4).

A detailed mechanism is still unknown as to why such an excellent effect is exhibited only when nitrogen is contained in and distributed throughout the silicon oxide-based protective layer. Presumably, this is because the nitrogen-containing compound reacts with an alkoxyl group contained in the silicon alkoxide and is accordingly incorporated into a reticulate structure composed of silicon and oxygen of the silicon oxide-based protective layer.

The amount of nitrogen thus contained in the silicon oxide-based protective layer is suitably 0.05 mass % to 0.5 mass % relative to the whole of the metal-coated flake glass, more preferably, 0.1 mass % to 0.3 mass %. If the amount of nitrogen is less than 0.05 mass %, the effect of suppressing corrosion of the metal coating layer is not sufficient. On the other hand, if the amount of nitrogen exceeds 0.5 mass %, adhesion thereof to a resin included in a below-described resin composition is decreased to result in a problem such as peeling of the metal-coated flake glass from the resin composition.

On the other hand, the silicon oxide-based protective layer is preferably constituted of an aggregate of silicon oxide-based particles having an average particle size of 10 nm to 100 nm, preferably, 10 nm to 50 nm. Here, the expression "aggregate of silicon oxide-based particles" is intended to indicate a state in which the silicon oxide-based particles are densely collected, and encompass a case where the particles are fused to each other.

Although depending on the method for forming the silicon oxide-based protective layer, the silicon oxide-based protective layer tends to be formed as an aggregate of silicon oxide-based particles. Hence, if the particle size thereof is too small, it takes a long time to form this layer, which unfavorably results in high production cost. On the other hand, if the particle size thereof is too large, a gap is produced between the particles to unfavorably result in insufficient effect of suppressing corrosion of the metal coating layer. Thus, it is preferable that the average particle size thereof falls within a range of 10 nm to 100 nm. If the particle size is less than 10 nm, the production cost becomes expensive, whereas if the particle size exceeds 100 nm, sufficient corrosion suppressing effect might not be obtained.

It should be noted that when the silicon oxide-based protective layer is thus constituted of the aggregate of the silicon oxide-based particles, nitrogen (i.e., nitrogen-containing compound) may exist in the silicon oxide-based particles or between the silicon oxide-based particles.

It should be also noted that the average particle size of the silicon oxide-based particles is determined as follows. 100 particles (irregularities on the surface of the layer) selected arbitrarily are observed by means of SEM to measure the shorter diameter of each of the particles, thereby finding an arithmetic mean value thereof. The arithmetic mean value thus found is regarded as the average particle size.

Further, the silicon oxide-based protective layer of the present invention preferably has an average thickness of 30 nm to 300 nm, and has a property to develop a color when a gold thin film is deposited thereon. If the average thickness of the silicon oxide-based protective layer is less than 30 nm, the corrosion suppressing effect is not sufficient. On the other hand, if the average thickness thereof exceeds 300 nm, the entire thickness of the metal-coated flake glass becomes thick to possibly result in decrease of hiding property or insufficient sheen of a painted film, disadvantageously.

It should be noted that the average thickness of the silicon oxide-based protective layer is determined as follows. That is, twenty metal-coated flake glasses selected arbitrarily are observed in cross section by means of SEM to measure the thickness of the silicon oxide-based protective layer of each metal-coated flake glass at five locations therein, thereby finding an arithmetic mean value thereof. The arithmetic mean value thus found is regarded as the average thickness.

It should be also noted that the thickness of the silicon oxide-based protective layer is preferably uniform in order to effectively exhibit the effect of suppressing corrosion of the metal coating layer. It is acknowledged that when the thickness thereof is uniform and a gold thin film having a thickness of approximately 100 Å is deposited on the silicon oxide-based protective layer of the metal-coated flake glass, the silicon oxide-based protective layer develops a color of purple, blue, green, yellow, red, or the like. Hence, it is preferable that the silicon oxide-based protective layer of the present invention has a property to develop a color when a gold thin film is deposited thereon.

A method for forming the silicon oxide-based protective layer of the present invention is not particularly limited, but it is preferable to form the silicon oxide-based protective layer by depositing silicon oxide-based particles and a nitrogen-containing compound on the metal coating layer of the flake glass using a silicon alkoxide and the nitrogen-containing compound as in a below-described production method.

Because the metal-coated flake glass thus structured in the present invention has its surface coated with the silicon oxide-based protective layer containing nitrogen, corrosion of the metal coating layer can be noticeably suppressed under corrosive environment, thereby preventing color change of the metal-coated flake glass.

In this way, the present invention has successfully solved such a problem that the conventional metal oxide layer containing no nitrogen is weak in water resistance and moisture resistance and therefore cannot sufficiently prevent color change of the metal coating layer formed on the flake glass.

<Resin Composition>

The resin composition of the present invention includes a resin and the above-described metal-coated flake glass. Such a resin composition can include any other components as long as the resin composition includes these. Specifically, the resin composition encompasses: a paint and an ink as well as a painted film and a printed matter, etc., formed using the paint and the ink (for ease of description, each of these compositions is also referred to as "coating composition"); and a resin-molded product, etc., formed by means of injection molding or the like.

Here, examples of the resin included in the resin composition of the present invention include: a melamine alkyd resin, a thermally curable acrylate resin, an acryl lacquer, a nitrocellulose lacquer, a polyester resin, a polyurethane resin, an ABS resin, a polystyrene resin, and the like. Further, the resin composition of the present invention includes other optional components, such as various types of color pigments, additives (a dispersant, a viscosity modifier, an antisettling agent, a plasticizer, a pigment sedimentation inhibitor, a defoaming agent, etc.), and solvents.

A composition ratio in the resin composition of the present invention is not particularly limited and can be set in a wide range depending on a type of application. For example, in the case where the resin composition is a paint, the metal-coated flake glass of the present invention can be blended therein at an amount of 0.05-20 parts by mass relative to 100 parts by mass of the resin solid content. If the amount of blending of the metal-coated flake glass is less than 0.05 parts by mass, a design improvement effect provided by the metal-coated flake glass is likely to be insufficient. On the other hand, if the amount thereof exceeds 20 parts by mass, physical properties of the resin composition such as luster, strength, and adhesion are likely to be adversely affected.

Meanwhile, when the resin composition of the present invention is a coating composition (in particular, a painted film), a clear layer may be provided on the coating composition. Alternatively, an intermediate coating layer or an undercoating layer may be provided therebelow.

<Production Method>

A method for producing the metal-coated flake glass of the present invention includes the steps of: preparing a flake glass having a surface coated with a metal coating layer; and forming a silicon oxide-based protective layer by dispersing the flake glass in a mixed solution including a silicon alkoxide, a nitrogen-containing compound, water, and a hydrophilic solvent so as to deposit silicon oxide-based particles and the nitrogen-containing compound on the metal coating layer of the flake glass.

By employing such a production method, the metal-coated flake glass obtained can be adapted to contain nitrogen in the silicon oxide-based protective layer at a specific amount (0.05 mass % to 0.5 mass % relative to the whole of the metal-coated flake glass).

Here, the step of preparing the flake glass can be performed by preparing a commercially available flake glass of various types having its surface coated with a metal coating layer, but the step of preparing can be also performed by fabricating a product obtained by forming a metal coating layer on a flake glass by means of a various types of known methods.

The following describes a various types of chemical agents used in the step of forming the silicon oxide-based protective layer.

First, examples of the silicon alkoxide include tetraethoxysilane, a condensate of tetraethoxysilane, tetraisopropoxysilane, a condensate of tetraisopropoxysilane, and the like. The silicon alkoxide is preferably used at an amount of approximately 1-50 parts by mass relative to 100 parts by mass of the flake glass having the metal coating layer formed thereon. For such a silicon alkoxide, one compound can be used or two or more of the compounds can be used in combination.

Examples of the nitrogen-containing compound include: acid amides (urea, dimethylfonnamide, oleic amide, stearic amide, and the like); amino acids (2-aminobenzoic acid, N-methyl glycine, cystine, phenylalanine, and the like), aliphatic amines (2-ethyl hexylamine, laurylamine, stearylamine, and the like), alkanolamines (2-dimethylamino ethanol, monoethanolamine, diethanolamine, triethanolamine, and the like), nitro compounds (2-nitropropane, nitrocellulose, and the like), amino group-containing coupling agents (aminophenyl silane, γ-aminopropyltrimethoxysilane, γ-aminopropyltriethoxysilane, N-β-(aminoethyl)-γ-aminopropyltrimethoxysilane, γ-ureidopropyltrimethoxysilane, trimethoxysilylpropyldiethylenetriamine, di-n-butoxy-bis(triethanolaminato)titanium, N,N-methylethyl amino titanate, or the like), polyvinyl pyrrolidone, piperazine, polyethylene imine, hexamethyldisilazane, N,O-bis(trimethylsilyl)acetamide, and the like. Among these nitrogen-containing compounds, it is more preferable to use an acid amide, an amino acid, an alkanolamine, an amino group-containing coupling agent, and the like, each of which contains an amino group and an oxygen-containing group at the same time. This is because such a nitrogen-containing compound containing the amino group and the oxygen-containing group at the same time achieves a stronger interaction with the resin included in the resin composition, thereby obtaining more excellent effect of suppressing corrosion of the metal coating layer.

With the amount of usage of the nitrogen-containing compound being approximately 0.1-10 parts by mass relative to 100 parts by mass of the flake glass having the metal coating layer formed thereon, the amount of nitrogen in the silicon oxide-based protective layer can fall within a range of 0.05 mass % to 0.5 mass % relative to the whole of the metal-coated flake glass. For such a nitrogen-containing compound, one compound can be used or two or more of the compounds can be used in combination.

It should be noted that each of the nitrogen-containing compounds exemplified above has a catalytic action for hydrolysis reaction of a silicon alkoxide. Therefore, the nitrogen-containing compound has an action of promoting hydrolysis of the silicon alkoxide into silicon oxide-based particles and the nitrogen-containing compound itself is also incorporated into the silicon oxide-based protective layer. In the case where such a nitrogen-containing compound does not have the above-described catalytic action or has a weak catalytic action, an additional hydrolysis catalyst, examples of which are described below, is preferably added.

The examples of the hydrolysis catalyst include: ammonia, triethylamine, n-butylamine, ethylenediamine, phosphoric acid, nitric acid, acetic acid, sodium hydroxide, potassium hydroxide, and the like. The hydrolysis catalyst is preferably used at an amount of approximately 1-10 parts by mass relative to 100 parts by mass of the flake glass having the metal coating layer formed thereon. For such a hydrolysis catalyst, one catalyst can be used or two or more of the catalysts can be used in combination.

Among the hydrolysis catalysts exemplified above, ammonia, triethylamine, n-butylamine, ethylenediamine, and the like contain nitrogen and therefore can be included in the above-described nitrogen-containing compound, but they are normally vaporized readily to get out of the system and are therefore not incorporated in the silicon oxide-based protective layer.

Examples of the hydrophilic solvent include methyl alcohol, ethyl alcohol, isopropyl alcohol, n-propyl alcohol, t-butyl alcohol, n-butyl alcohol, isobutyl alcohol, ethyl cellosolve, butyl cellosolve, propylene glycol monobutyl ether, dipropylene glycol monomethyl ether, propylene glycol monopropyl ether, acetone, and the like.

The hydrophilic solvent is preferably used at an amount of 500-10000 parts by mass relative to 100 parts by mass of the flake glass having the metal coating layer formed thereon. For such a hydrophilic solvent, one solvent can be used or two or more of the solvents can be used in combination.

Further, approximately 1-10 equivalent amounts (preferably, 2-5 equivalent amounts) of the above-described water is used relative to 1 equivalent amount of the silicon alkoxide.

Further, the step of forming the silicon oxide-based protective layer is performed under the following specific reaction conditions.

That is, flake glasses each having its surface coated with a metal coating layer are dispersed in a mixed solution containing the silicon alkoxide, the nitrogen-containing compound, the water, and the hydrophilic solvent. In this case, the mixed solution may initially contain the silicon alkoxide, the nitrogen-containing compound, the water, and the hydrophilic solvent. However, it is preferable that while dispersing the flake glasses in a solution including the water and the hydrophilic solvent, the silicon alkoxide and the nitrogen-containing compound are dropped thereto little by little in amount for 1 hour to 20 hours (preferably 3 hours to 10 hours). In this way, the flake glasses each having its surface coated with the metal coating layer are suitably dispersed in the mixed solution containing the silicon alkoxide, the nitrogen-containing compound, the water, and the hydrophilic solvent.

With this operation, the silicon oxide-based particles and the nitrogen-containing compound can be deposited on the metal coating layer of the flake glass to form the silicon oxide-based protective layer (i.e., form the silicon oxide-based protective layer containing nitrogen distributed entirely therein). Accordingly, the metal-coated flake glass can be produced which is configured to include: the flake glass; the metal coating layer formed to coat the surface of the flake glass; and the silicon oxide-based protective layer formed to coat the surface of the metal coating layer, the silicon oxide-based protective layer containing nitrogen at an amount of 0.05 mass % to 0.5 mass % relative to the whole of the metal-coated flake glass.

In the step of forming the above-described silicon oxide-based protective layer, it is preferable to set a temperature at approximately 10° C. to approximately 100° C. (preferably, approximately 30° C. to approximately 90° C.) and it is preferable to set a reaction time at approximately 0.5 hour to approximately 30 hours (preferably approximately 3 hours to approximately 10 hours). This reaction time includes time for dropping the silicon alkoxide and the nitrogen-containing compound little by little in amount, but it is preferable to continue the reaction for approximately 0.5 hour to approximately 5 hours even after the dropping is finished, so as to completely end the reaction. It should be noted that if the dropping time is less than 1 hour, it may be difficult to form a silicon oxide-based protective layer having a uniform thickness, whereas if the dropping time exceeds 20 hours, productivity is decreased to result in high production cost.

In the case where the hydrolysis catalyst is used, the hydrolysis catalyst may be dropped together with the silicon alkoxide and the nitrogen-containing compound, or may be dispersed together with the flake glasses.

In the production method of the present invention, the metal-coated flake glass produced in the manner described above may be separated from the liquid and be used without being dried, but the metal-coated flake glass separated from the liquid may be dried and be used in the form of powder (powder state).

Specifically, the production method of the present invention can include the step of drying the obtained metal-coated flake glass at a temperature equal to or lower than the volatilization temperature of the nitrogen-containing compound. Through this step, the metal-coated flake glass in the powder state can be obtained.

Here, the term "volatilization temperature of the nitrogen-containing compound" refers to a temperature at which the nitrogen-containing compound is formed into gas and vaporized to get out of the system as a result of boiling, sublimation, decomposition, oxidation, or the like under atmosphere and pressure under which the drying is performed. Hence, the drying temperature can be normally set at 60° C. to 150° C., more preferably, 80° C. to 140° C. The drying time is preferably set at 0.5 hour to 24 hours, more preferably, approximately 3 hours to approximately 15 hours.

Thus, the production method of the present invention does not include the firing step employed in, for example, Patent Literature 4, i.e., the firing step in which a high temperature of 500° C. or greater is applied in order to form the dense protective coating layer. Accordingly, excellent effects are provided such that no costly energy cost is required, the production method is simple and inexpensive, and contribution is made to global warming prevention. Further, the above-described firing step causes shrinkage of the dense protective coating layer, which leads to generation of cracks to decrease the corrosion suppressing effect, disadvantageously. Such a problem is eliminated by the production method of the present invention.

EXAMPLES

The following describes the present invention more in detail with reference to examples, but the present invention is not limited to these.

Example 1

First prepared were commercially available flake glasses (trademark: Metashine 2025PS provided by Nippon Sheet Glass, Co., Ltd) each having its surface coated with a metal coating layer (average thickness of about 1000 nm) constituted of silver. Further, 60 g of the commercially available flake glasses were dispersed in 600 g of ethyl alcohol serving as a water-soluble solvent, so as to prepare a slurry. Then, 5 g of ammonia water (25 mass %) and 5 g of water were further added to the slurry.

While maintaining the temperature of the slurry at 70° C. and stirring it (i.e., dispersing the flake glasses in the solution including the water and the hydrophilic solvent), a solution in which 20 g of tetraethoxysilane (TEOS) and 5 g of γ-aminopropyltrimethoxysilane were dissolved in 20 g of ethyl alcohol was dropped little by little in amount for 3 hours. The tetraethoxysilane (TEOS) is a silicon alkoxide and the γ-aminopropyltrimethoxysilane is a nitrogen-containing compound. Then, the slurry was left for reaction for 0.5 hour.

Then, this slurry was cleaned using ethyl alcohol, and was then filtered. Resulting filtered objects (metal-coated flake glasses) were subjected to drying treatment at 130° C. for 3 hours, thereby obtaining a powdery metal-coated flake glass having the structure of the present invention.

An amount of nitrogen in the metal-coated flake glass (i.e., amount of nitrogen contained in the silicon oxide-based protective layer (layer constituted of polysiloxane)) was measured (in accordance with a catalyst oxidative degradation, chemiluminescence method (under reduced pressure)) using a "small-amount total nitrogen analyzer TN-110" provided by Mitsubishi Chemical Analytech Co., Ltd. The amount of nitrogen thus measured was 0.15 mass % relative to the whole of the metal-coated flake glass.

Figure 1:
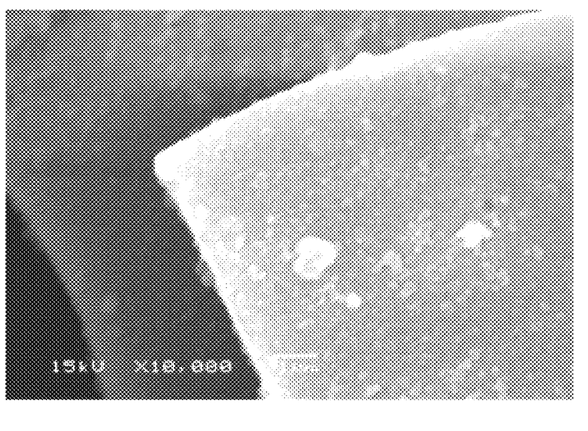
FIG. 1 shows an SEM (scanning electron microscope) photograph of a metal-coated flake glass of the present invention.

Further, this metal-coated flake glass was attached to a carbon platform for SEM observation, and a gold thin film was deposited thereon. Accordingly, it developed a blue color. Further, the average thickness of the silicon oxide-based protective layer was measured through cross section observation using the SEM. The average thickness thereof was 70 nm. The metal-coated flake glass was continuously observed using the SEM. As a result, it was found that an aggregate of silicon oxide-based particles were adhered uniformly on the metal coating layer constituted of silver. From surface irregularities thereof, the average particle size of the silicon oxide-based particles was measured to be 20 nm. FIG. 1 shows an SEM photograph of this metal-coated flake glass. In the photograph, a plate-like object of soft gray color at the front side corresponds to the metal-coated flake glass, and granular objects on the surface thereof correspond to the silicon oxide-based particles.

Examples 2 to 9

Metal-coated flake glasses were fabricated in the same manner as in Example 1 except that types of the materials and amounts of addition thereof were changed from those in Example 1 as shown in Table 1. However, in Example 3, 20 g of tetraethoxysilane and 10 g of urea were dissolved in 20 g of water instead of 20 g of ethyl alcohol. Further, Example 6 employed a flake glass (average particle size: about 25 μm; average thickness: about 1000 nm; and the thickness of the copper coating layer: about 30 nm) coated with a metal coating layer constituted of copper, instead of the commercially available flake glass used in Example 1.

ammonia, which was used as a catalyst, was slightly adsorbed to and remained in the surface of the metal-coated flake glass.

Comparative Example 2

A metal-coated flake glass was fabricated in the same manner as in Example 1 except that γ-aminopropyltrimethoxysilane was used as the nitrogen-containing compound and an amount of addition thereof was 30 g. In the metal-coated flake glass obtained, an amount of nitrogen (i.e., amount of nitrogen in the silicon oxide-based protective layer) was 0.8 mass % relative to the whole of the metal-coated flake glass.

Comparative Example 3

60 g of tetraethoxysilane, 500 ml of ethyl alcohol, and 200 ml of water were mixed to prepare a solution. Into this solution, 60 g of flake glasses, which were the same as the commercially available flake glasses in Example 1, were added. While stirring using a stirrer, 14 g of ammonium hydroxide was added thereto.

In this way, hydrolysis reaction was performed for 3 hours. Then, a water-washing treatment, a filtering treatment, and a drying treatment were performed in this order. Thereafter, firing was performed at 550° C. for 1 hour. As a result, a metal-coated flake glass was obtained which had a metal coating layer constituted of silver and having its surface on which a $SiO_2$ coating film was formed.

An amount of nitrogen in this metal-coated flake glass was measured in the same manner as in Example 1. The amount of nitrogen therein was 0.001 mass % relative to the whole of the metal-coated flake glass. Further, a gold thin film was deposited on this metal-coated flake glass, and then observation was performed using an SEM. It was confirmed that that no color was recognized to be developed therein and the film formed on the surface thereof had a non-uniform thickness and was partially cracked. Further, a multiplicity of silicon oxide-

TABLE 1

| Example No. | Metal Constituting Metal Coating Layer | Silicon Alkoxide Type | Silicon Alkoxide Amount of Addition (g)[Note 1] | Nitrogen-Containing Compound Type | Nitrogen-Containing Compound Amount of Addition (g)[Note 1] |
|---|---|---|---|---|---|
| 1 | Silver | TEOS | 20 | Aminosilane[Note 2] | 5 |
| 2 | Silver | TEOS | 20 | Anthranilic Acid | 5 |
| 3 | Silver | TEOS | 20 | Urea | 10 |
| 4 | Silver | TEOS | 20 | Monoethanolamine | 10 |
| 5 | Silver | TEOS | 20 | Laurylamine | 10 |
| 6 | Copper | TEOS | 20 | Aminosilane[Note 2] | 10 |
| 7 | Silver | TEOS | 10 | Aminosilane[Note 2] | 5 |
| 8 | Silver | TEOS | 30 | Aminosilane[Note 2] | 5 |
| 9 | Silver | ES-40[Note 3] | 15 | Aminosilane[Note 2] | 5 |

[Note 1] Each of the amounts of addition of the silicon alkoxide and the nitrogen-containing compound is relative to 60 g of the flake glasses each having the metal coating layer formed thereon.
[Note 2] γ-aminopropyltrimethoxysilane
[Note 3] a condensate of pentamer of tetraethoxysilane (trademark: Ethylsilicate 40 provided by Colcoat Co., Ltd)

Comparative Example 1

A metal-coated flake glass was fabricated in the same manner as in Example 1 except that 5 g of γ-aminopropyltrimethoxysilane, which was the nitrogen-containing compound, was not added. In other words, in this metal-coated flake glass, nitrogen was not contained in the silicon oxide-based protective layer. It should be noted that Table 2 below shows that an amount of nitrogen was 0.003 mass % because based particles were observed which were not adhered to the surface of the metal-coated flake glass and exist independently.

Comparative Example 4

30 parts by mass of the metal-coated flake glass obtained in Comparative Example 3 were dispersed in 200 parts by mass of ethyl alcohol to obtain a slurry. Then, 1 part by mass of γ-aminopropyltriethoxysilane and 1 part by mass of water were added to the slurry. It was stirred at 70° C. for 30 minutes.

Thereafter, the slurry was subjected to solid-liquid separation and drying was performed at 120° C. for 8 hours, thereby obtaining a metal-coated flake glass. An amount of nitrogen in the metal-coated flake glass thus obtained was measured in the same manner as in Example 1. The amount of nitrogen therein was 0.03 mass relative to the whole of the metal-coated flake glass.

It should be noted that each of the metal-coated flake glasses of Comparative Example 3 and Comparative Example 4 corresponds to the metal-coated flake glass obtained by implementing Patent Literature 4.

Comparative Examples 5 and 6

The commercially available flake glass used in Example 1 but having been subjected to no treatment was regarded as Comparative Example 5. The flake glass having the metal coating layer constituted of copper in Example 6 but having been subjected to no treatment was regarded as Comparative Example 6.

<Evaluation>

Performances of the metal-coated flake glasses of Examples 1-9 and Comparative Examples 1-6 obtained as above were evaluated as follows.

<Preparation of Water-Based Paint>

A composition I was obtained by stirring and mixing the followings for 30 minutes or longer: 31.48 g of an acrylic dispersion (trademark: Setaqua 6802 provided by Neuplex Pty Ltd); 18.89 g of a polyurethane dispersion A (trademark: Bayhydrol XP2621 provided by Sumika Bayer Urethane Co., Ltd.); 4.61 g of a polyurethane dispersion B (trademark: Bayhydrol PT241 provided by Sumika Bayer Urethane Co., Ltd.); 2.1 g of a melamine compound (trademark: Cymel 327 provided by Mitsui Cytec, Ltd.); 2.79 g of butyl glycol; 0.31 g of a surfactant (trademark: Byk-347 provided by ByK-Chemie Japan K.K.); 0.56 g of a thickener (trademark: Viscalex HV30 provided by Nichigo-Mowinyl Co., Ltd.); 13.96 g of ion-exchanged water; and 3.04 g of a 10% dimethylethanolamine aqueous solution.

Further, 1.12 g of the metal-coated flake glasses were sampled from the respective metal-coated flake glasses obtained as above and were put in plastic containers respectively. Then, 2.43 g of butyl glycol was further added to each of them and was dispersed uniformly using a glass rod. Further, 2 g of a dispersant (trademark: Disperbyk 190 provided by ByK-Chemie Japan K.K.), 0.08 g of a wetting agent (trademark: Byk-011 provided by ByK-Chemie Japan K.K.), 0.12 g of a pigment wetting dispersant (trademark: AQ320 provided by Kusumoto Chemicals, Ltd.) were added thereto, and were stirred and mixed for 10 minutes or longer, thereby obtaining a composition II.

Then, composition I and composition II were stirred and mixed for 10 minutes or longer. Thereafter, the mixture was provided with a 10% dimethylethanolamine aqueous solution to have a pH of 8 or greater, and was stirred and mixed for another 10 minutes or longer. Thereafter, an appropriate amount of ion-exchanged water was added thereto to attain a viscosity of a reference value (Flow Time of 25 seconds in Ford cup No. 4), and the mixture was stirred and mixed for 10 minutes or longer, thereby obtaining a water-based paint.

Meanwhile, 51.15 g of polyacrylate (trademark: Desmophen A870BA provided by Sumika Bayer Urethane Co., Ltd.), 0.53 g of an additive A (10% xylene solution of Baysilone Paint Additive OL17 (trademark) provided by Borchers GmbH)), 0.53 g of an additive B (1% xylene solution of Modaflow (trademark) provided by Monsanto Company)), 5.3 g of an additive C (10% xylene solution of Tinuvin 292 (trademark) provided by Ciba Spezialitatenchemie Lampertheim GmbH)), 10.7 g of an additive D (10% xylene solution of Tinuvin 1130 (trademark) provided by Ciba Spezialitatenchemie Lampertheim GmbH)), 10.17 g of a diluting solvent A (1-methoxypropyl acetate:solvent naphtha=1:1 (mass ratio)), and 2.13 g of a diluting solvent B (butyl glycol acetate) were stirred and mixed for 30 minutes or longer.

Thereafter, the mixture was provided with 19.49 g of a dilution of isocyanurate (trademark: Sumidur N3300 provided by Sumika Bayer Urethane Co., Ltd.) and a mixed solvent of butyl acetate and solvent naphtha (1:1 in mass ratio) by 9:1 (mass ratio), and was mixed and stirred for 30 minutes or longer, thereby obtaining a clear coat.

<Method for Fabricating Painted Plate>

The water-based paint prepared as above was applied to a metal plate by spraying. A resulting plate by the spray painting (hereinafter, referred to as "spray-painted plate") was set at a normal temperature for 5 minutes or longer. Then, the spray-painted plate was dried at 80° C. for 3 minutes. Thereafter, the spray-painted plate was set at the normal temperature for 10 minutes or longer. Then, the clear coat was applied to the spray-painted plate by means of spraying.

After the application of the clear coat, the plate was set at the normal temperature for 10 minutes or longer, and was baked at 130° C. for 30 minutes, thereby obtaining a painted plate having the water-based paint and the clear coat sprayed thereon. When performing the spray painting, paint application conditions were adjusted such that a painted film constituted of the water-based paint would have a thickness of 14 μm to 18 μm and a painted film constituted of the clear coat would have a thickness of 35 μm to 40 μm in this painted plate.

<Accelerated Weathering Test>

The painted plate obtained as above was subjected to accelerated weathering test (conditions: xenon lamp irradiation strength of 180 W/m$^2$; black panel temperature of 63° C.; rainfall condition of 18 minutes/2 hours; test time of 2000 hours), using a 7.5 kW superxenon weather meter (trademark: superxenon weather meter SX75) provided by Suga Test Instruments Co., Ltd.). The color tones of the painted plate before and after the test were evaluated by measuring values of $L^*_{45}$, $a^*_{45}$, $b^*_{45}$ at an observation angle of 45° (light reception in a direction normal to the painted film) using a multi-angle colorimeter (trademark: X-Rite MA-68II provided by X-Rite, Incorporated) so as to find a change in color tone of the painted film before and after the test as a color difference $\Delta E^*_{45}$. A result thereof is shown in Table 2. As color difference $\Delta E^*_{45}$ is smaller in numerical value, corrosion of the metal coating layer is suppressed more.

<Secondary Adhesion Test of Painted Film>

The painted plate obtained as above was soaked in warm water of 40° C. for 10 days, and the painted film was taken out to evaluate adhesion thereof by means of a cross cut test (JIS K5400 8.5.2). A result thereof is shown in Table 2. In the evaluation, a case where peeling of the painted film was not observed was evaluated as "A", and a case where peeling thereof was observed was evaluated as "B". In each of those evaluated as "B", the peeling of the painted film took place presumably due to the following reason. That is, an interaction was weaker between the resin in the resin composition and the silicon oxide-based protective layer as compared with those evaluated as "A". Accordingly, moisture was more likely to enter the interface therebetween, with the result that the moisture thus having entered acted to inhibit the adhesion.

TABLE 2

| Examples/Comparative Examples | Amount of Nitrogen (mass %) | Average Particle Size of Silicon Oxide-Based Particles (nm) | Average Thickness of Silicon Oxide-Based Protective Layer (nm) | Color Development by Deposition of Gold Thin Film | Accelerated Weathering Test Color Difference ($\Delta E^*_{45}$) | Secondary Adhesion Test |
|---|---|---|---|---|---|---|
| Example 1 | 0.15 | 20 | 70 | Blue | 0.9 | A |
| Example 2 | 0.17 | 20 | 70 | Blue | 1.2 | A |
| Example 3 | 0.2 | 20 | 70 | Blue | 0.8 | A |
| Example 4 | 0.2 | 20 | 70 | Blue | 1.3 | A |
| Example 5 | 0.11 | 20 | 70 | Blue | 1.5 | A |
| Example 6 | 0.16 | 20 | 60 | Blue | 1.5 | A |
| Example 7 | 0.14 | 15 | 30 | Yellow | 2.3 | A |
| Example 8 | 0.16 | 50 | 100 | Orange | 0.9 | A |
| Example 9 | 0.14 | 25 | 72 | Green | 1.4 | A |
| Comparative Example 1 | 0.003 | 20 | 50 (Not Uniform) | No Color Developed | 12.4 | B |
| Comparative Example 2 | 0.8 | 20 | 70 | Blue | 2.5 | B |
| Comparative Example 3 | 0.001 | Cannot be Measured | 150 (Not Uniform) | No Color Developed | 8.5 | B |
| Comparative Example 4 | 0.03 | Cannot be Measured | 150 (Not Uniform) | No Color Developed | 7.2 | A |
| Comparative Example 5 | 0.001 or smaller | — | — | No Color Developed | 15.9 | B |
| Comparative Example 6 | 0.001 or smaller | — | — | No Color Developed | 26.4 | B |

It should be noted that "Amount of Nitrogen" in Table 2 indicates an amount of nitrogen (relative to the whole of the metal-coated flake glass) contained in the silicon oxide-based protective layer (the metal-coated flake glass in the case of Comparative Examples 3-6). Further, the case where the average particle size of the silicon oxide-based particles "cannot be measured" corresponds to a state in which the silicon oxide-based particles are fused to one another and trace of the particles cannot be seen (in this state, cracks were observed in a part of the silicon oxide-based protective layer). Furthermore, "-" in Table 2 indicates that the silicon oxide-based protective layer itself is not formed. Further, a silicon oxide-based protective layer having a non-uniform average thickness is indicated as "Not Uniform".

As apparent from Table 2, the metal-coated flake glasses of Examples are more excellent in performance than the metal-coated flake glasses of Comparative Examples.

Specifically, for example, in the case where the amount of nitrogen in the silicon oxide-based protective layer is smaller than the value defined in the present invention (Comparative Example 1), corrosion of the metal coating layer becomes notable ($\Delta E^*_{45}$ becomes large) and the adhesion of the painted film becomes insufficient. On the other hand, in the case where the amount of nitrogen in the silicon oxide-based protective layer is larger than the value defined in the present invention (Comparative Example 2), corrosion of the metal coating layer becomes slightly notable ($\Delta E^*_{45}$ becomes slightly large) and the adhesion of the painted film becomes poor. Further, in the case where a treatment is performed to provide nitrogen in the silicon oxide-based protective layer only at its surface portion so as not to distribute it throughout the silicon oxide-based protective layer (Comparative Example 4), corrosion of the metal coating layer becomes notable.

In contrast, as to each of the metal-coated flake glasses having the configuration of the present invention, it was confirmed that the specific amount of nitrogen contained in the silicon oxide-based protective layer particularly allows for noticeable suppression of corrosion of the metal coating layer.

Heretofore, the embodiments and examples of the present invention have been illustrated, but it has been initially expected to appropriately combine configuration of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A metal-coated flake glass comprising:
   a flake glass;
   a metal coating layer formed to coat a surface of said flake glass; and
   a silicon oxide-based protective layer formed to coat a surface of said metal coating layer,
   said silicon oxide-based protective layer selected from the group consisting of one or more of silicon oxide, represented by $SiO_x$, wherein x is any positive number, polysiloxane generated by hydrolysis of a silicon alkoxide, and silicon hydrate, and
   said silicon oxide-based protective layer containing nitrogen distributed throughout the silicon oxide-based protective layer in an amount of 0.05 mass % to 0.5 mass % relative to a whole of said metal-coated flake glass.

2. The metal-coated flake glass according to claim 1, wherein said metal coating layer is constituted of one of silver, copper, and an alloy thereof.

3. The metal-coated flake glass according to claim 1, wherein said silicon oxide-based protective layer is constituted of an aggregate of silicon oxide-based particles having an average particle size of 10 nm to 100 nm.

4. The metal-coated flake glass according to claim 1, wherein said silicon oxide-based protective layer has an average thickness of 30 nm to 300 nm, and has a property to develop a color when a gold thin film is deposited thereon.

5. A resin composition comprising a resin and the metal-coated flake glass recited in claim 1.

* * * * *